Sept. 27, 1960 C. E. ANDERSON 2,954,441

WIDE BAND MAGNETIC SYSTEM

Filed Dec. 13, 1955 4 Sheets-Sheet 1

INVENTOR.

CHARLES E. ANDERSON

BY

Fleher and Swain

ATTORNEYS.

INVENTOR.
CHARLES E. ANDERSON
BY
Fleder and Swain
ATTORNEYS.

INVENTOR.
CHARLES E. ANDERSON
BY
Flehr and Swain
ATTORNEYS

Sept. 27, 1960 C. E. ANDERSON 2,954,441

WIDE BAND MAGNETIC SYSTEM

Filed Dec. 13, 1955 4 Sheets-Sheet 4

INVENTOR.

CHARLES E. ANDERSON

BY

Flehr and Swain

ATTORNEYS

United States Patent Office 2,954,441
Patented Sept. 27, 1960

2,954,441

WIDE BAND MAGNETIC SYSTEM

Charles E. Anderson, San Carlos, Calif., assignor to Ampex Corporation, Redwood City, Calif., a corporation of California Filed Dec. 13, 1955, Ser. No. 552,853

3 Claims. (Cl. 179—100.2)

This invention relates generally to a magnetic tape system and method, and more particularly to a magnetic tape system and method capable of recording and/or reproducing a signal which extends over a wide frequency spectrum, including, for example, a monochrome video signal.

In co-pending application Serial No. 524,004, filed July 25, 1955, for "Broad Band Magnetic Tape System and Method," there is disclosed a system making use of a rotary head assembly for recording and/or reproducing signals over a wide frequency spectrum. The head assembly used in that system employs a plurality of transducer units which are mounted to rotate and sweep transversely across a magnetic tape. Speed control means is employed in conjunction with the means for driving the head assembly and the means for driving the magnetic tape during recording, and to ensure accurate tracking and synchronization during reproduction. The tape employed is relatively wide as compared with tapes used in conventional tape practice. The side margins of the tape may be employed for sound recording and for recording control frequencies used in conjunction with speed control means. The system disclosed in the co-pending application employs F.-M. carrier recording although the rotary head assembly and the associated mechanical parts may be used for A.-M. carrier recording.

In co-pending application Serial No. 552,854, filed December 13, 1955, entitled "Magnetic Tape System and Method" filed simultaneously herewith, there is disclosed a system for recording a plurality of signals on a single magnetic track. The signals are interlace multiplexed to form a composite signal which is recorded on the single magnetic track.

The modulation frequency spectrum of a monochrome television signal is made up of energy arranged in clusters around the horizontal line scanning frequency of 15,750 c.p.s. and its harmonics. In practice, the sideband components comprising each cluster are separated from each other by 30 c.p.s., the frame frequency rate. The components of each cluster are distributed symmetrically around a frequency corresponding to the scanning frequency or an even or odd multiple thereof.

Thus frequency spaces exist between the signal energy points in each cluster, these being 60 c.p.s. separations and between the respective components of adjacent clusters, these being separated by 15,750 c.p.s. It is evident that room exists for modulation of a carrier by other frequencies if they can be made to fall in between these multiples of the horizontal line scanning frequency. In other words, the monochrome picture information does not occupy all the space present in the broad band spectrum of the signal; more information can be added within the original monochrome video frequency spectrum limits.

Similar spacing "holes" exist in other applications such as in radar scanning where the energy is not continuous throughout the frequency band.

It is a general object of the present invention to provide a system and method for recording and/or reproducing the information contained in a broad frequency spectrum.

It is another object of the present invention to provide a wide band magnetic tape method and system for recording and/or reproducing a frequency spectrum of the above character in which the higher frequency components are shifted and interlaced with the lower frequency components to reduce the band width of the spectrum prior to recording.

It is another object of the present invention to provide a wide band magnetic tape system and method for recording a wide frequency spectrum in which the higher components of the spectrum have their frequencies shifted, inverted and interlaced with the lower frequency components to thereby form a reduced frequency spectrum for recording.

These and other objects of the invention will become more apparent from the following description read in conjunction with the drawing.

Referring to the drawing.

Figure 1A:
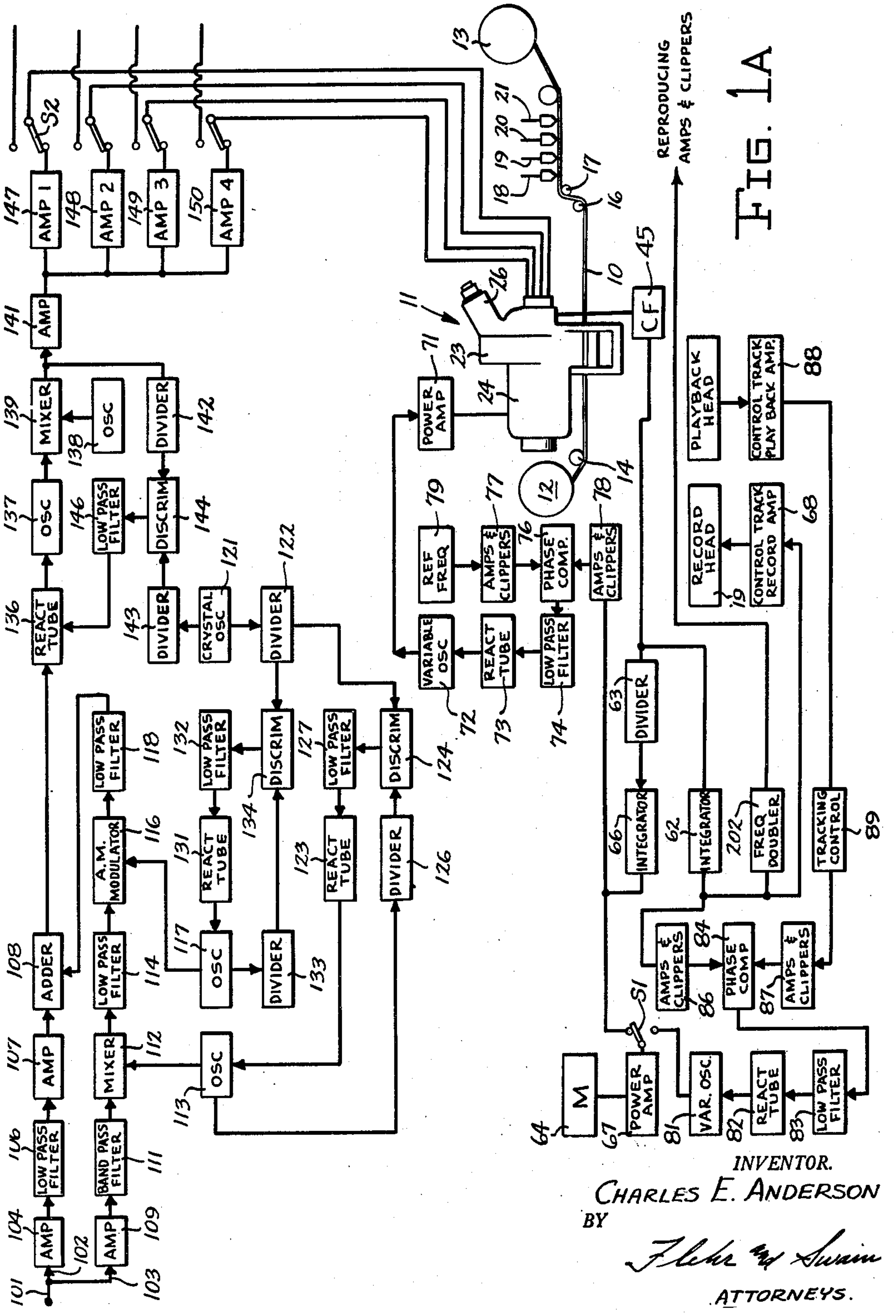
Figures 1A–1B show a circuit diagram illustrating a complete recording and reproducing system incorporating the present invention.
Figures 2, 3:
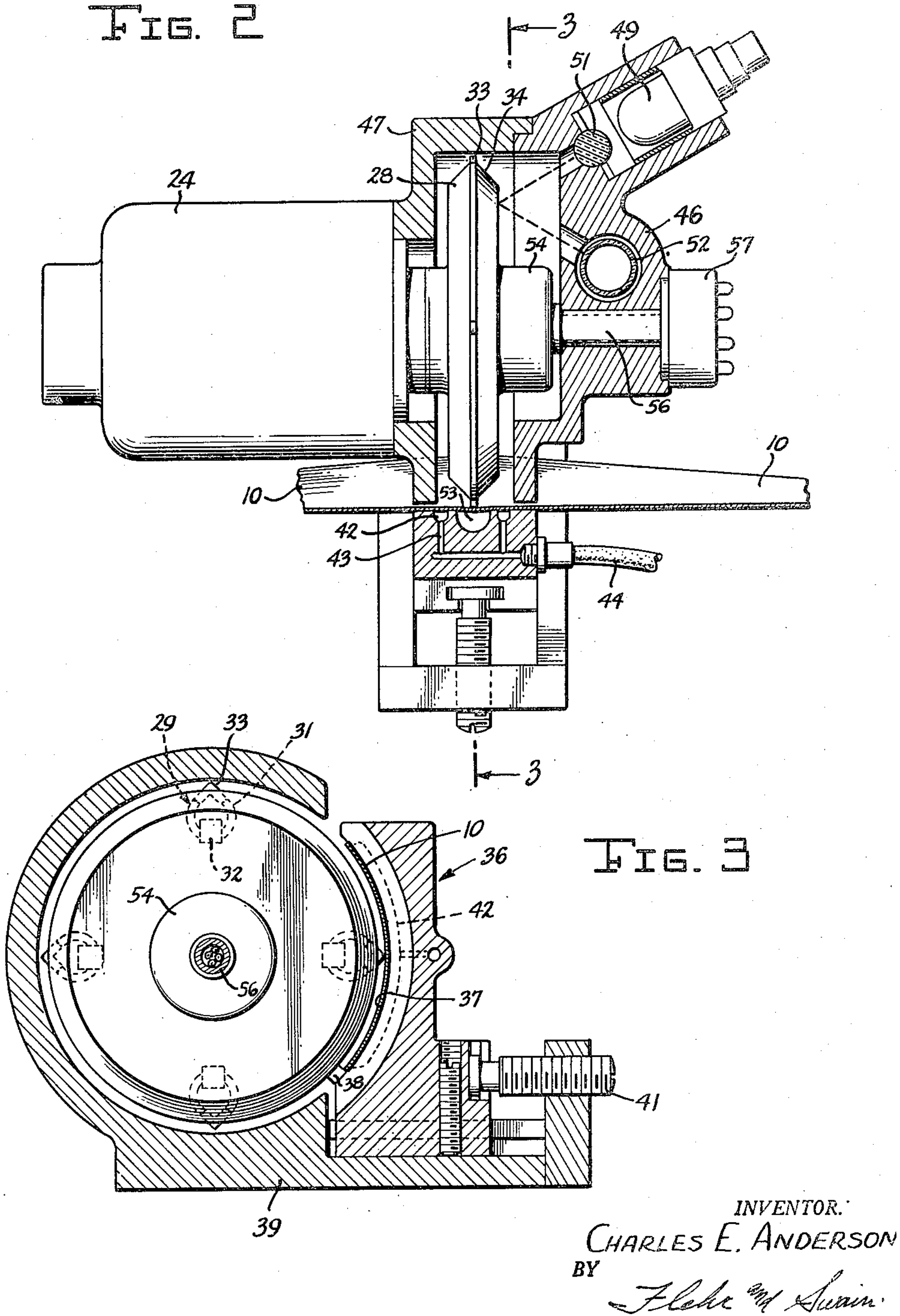
Figure 2 is a plan view partly in section illustrating the rotary head assembly and associated parts.
Figure 3 is a cross sectional view taken along the line 3—3 of Figure 2.

The present method and system may employ apparatus 11 (Figure 1A) of the type having a plurality of recording or playback (i.e. transducers) units which are caused to sweep successively across a magnetic tape as the tape is moved longitudinally. Preferably the sweep paths of the units are rectilinear, and the tape is cupped or curved to conform to the surface of a cylinder in the region where it is contacted by the units. Suitable apparatus of this type is illustrated in Figures 2 and 3. The transport means illustrated for carrying and feeding the tape 10 past the units includes conventional supply and takeup reels 12 and 13 which may be carried by suitable turntables. Guide studs or rollers 14 and 16, which are preferably flanged, are disposed to engage the tape at spaced intervals from the operating heads of the head assembly. The tape also engages the driving capstan 17, and for purposes to be presently explained, it is shown in contact with the magnetic heads 18, 19, 20, 21, which operate upon the margins of the tape. The tape employed is of substantial width compared with the tape used with conventional magnetic equipment. For example, it may have a width of the order of two inches. Like magnetic tape now available on the market for sound recording, it consists of a pliable film of plastic material having a thin coating of magnetic material on one side of the same which is magnetized by the signal to provide a magnetic record.

The head assembly 23 is driven by a suitable electric motor 24. Pulse generating means 26 is associated with the head assembly and serves to generate pulses having a frequency dependent upon the speed of rotation of the head assembly 28. The pulses thus generated are used in conjunction with the speed control system.

A suitable head assembly having pulse generating means is illustrated in Figures 2 and 3. A wheel 28 is directly mounted on the shaft of the motor 24. This wheel carries a plurality of transducer units 29. Each of these units consists of a magnetic core 31 together with suitable core windings 32. The tips 33 of the units are made of relatively hard material and project a short distance beyond the wheel 28. Preferably, the wheel is beveled as indicated at 34, whereby the peripheral surface has a width which corresponds generally to the width of the tips of the transducer units 29. The thin magnetic gap between the tips of each unit may be in a plane which is coincident with the axis of rotation and perpendicular to the plane of the wheel. A tape retaining or holding means designated generally by the reference numeral 36 is placed adjacent one side of the wheel 28. The retaining or holding means 36 serves to present the tape in the desired cupped condition for contact with the rotating tips of the transducer units. Referring particularly to Figure 3, the holder 36 has a tape engaging surface 37 formed as an arc of a circle and having the axis of the motor shaft as its center. One or more stops or shoulders 38 are provided for engaging one edge of the tape. The holder can be mounted on a guideway 39, provided with means such as adjusting screw 41, whereby it may be set in the proper relative position to the motor shaft.

Preferably, pneumatic means is employed to insure contact of the tape with the arcuate surface 37. Thus the grooves 42 are provided which terminate short of the upper and lower edges of the arcuate surface 37, and which are connected to ducts 43 which communicate with the tube 44. The tube provides means for connecting to a suitable vacuum system. In general, it is preferable that the vacuum be adjustable, and this may be accomplished by means of suitable valves placed in the connecting line 44.

Figure 4:
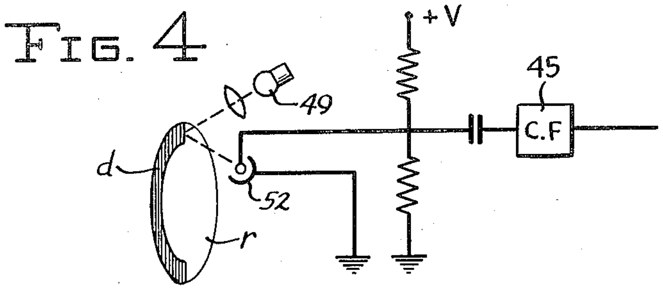
Figure 4 is a circuit diagram schematically illustrating the pulse generator.

The pulse generating means can be a separate mechanism having a mechanical connection to the wheel 28. However, we prefer to employ simple means of the type illustrated in Figure 2. The mounting 46 in conjunction with the part 47 forms a housing for the wheel 28. A source of light, such as an electric lamp 49, is focused by the lens 51 upon one side of the wheel 28. The light reflected from the wheel is received by the photoelectric tube 52. Referring particularly to Figure 4, one segment of the wheel is shown darkened *d* and another segment made light reflecting *r*. Thus recurrent pulses of light will strike the photoelectric tube 52 whereby a pulsating output having a frequency which corresponds to the speed of rotation of the wheel 28 is generated. The photoelectric tube is coupled to a cathode follower 45, the output of which is applied to the motor control system, and is also employed to perform certain switching operations during playback.

Figure 2 illustrates the manner in which the magnetic tape is cupped as it moves past the wheel 28 and in contact with the curved surface 37 of the holding means 36. The holder is recessed or cut away as indicated at 53 for the entire length of the arcuate surface 37. The portions of the tape scanning this recess are contacted by the tips 33 of the transducer units. Normally the contact is of sufficient pressure to slightly stretch and indent the tape in the small localized region being contacted by the transducer tip. The gap 53 allows the tape to be deflected. This system serves to provide a relatively stable and continuous contact pressure between the tape and the transducer units as they sweep across the tape.

Means are provided to make external connections to the several transducer units 29. For example, a suitable slip ring means may be provided within the wheel hub 54. The leads from the slip rings are then taken out through the opening 56 to the terminal block 57. One side of the transducer unit can be grounded and the other side connected to the slip ring means which in turn connects with the individual leads for the external connection.

The apparatus described above requires proper speed control for both the recording and reproducing operations. The complete system illustrated in Figure 1A incorporates means for controlling both the capstan drive and the head assembly drive. As illustrated in Figure 1A the cathode follower 45 is connected to the wave shaping filter or integrator 62 and to the divider 63. The divider serves to reduce the frequency of the pulses to a frequency which is convenient for operating the synchronous or alternating current motor 64, designated by the block M which is employed for driving the capstan. The output of the divider 63 is applied to the wave shaping filter or integrator 66, thence to the power amplifier which serves to amplify the signal sufficiently for driving the motor 64. The wave shaping filters or integrators 62 and 66 may be simple LC circuits tuned to the frequency being passed and serving to shape the wave to more nearly a sine wave form.

The signal from the pulse generating means is also recorded on the margin of the tape as a recorded control frequency. Thus the filter or integrator 62 connects with the amplifier 68 which in turn has its output applied to the record head 18. This record head operates on one margin of the tape and serves to record a control frequency on the tape as it is moved longitudinally past the head.

The motor 24 which drives the head assembly has its power supplied by the power amplifier 71. The power amplifier has its input connected to the variable oscillator 72 which includes suitable means for controlling its frequency of operation. For example, the means may comprise a reactance tube 73 which serves to control the frequency of the oscillator 72 as the applied voltage is varied. The controlling voltage is applied to the reactance tube 73 through the low pass filter 74 which is connected to the phase comparator 76.

The amplifiers and clippers 77 and 78 are both connected to the phase comparator 76. A suitable source of reference frequency 79 is connected to the amplifiers and clippers 77. The source of frequency may be any suitable source such as the ordinary 60 cycle current supply. The amplifiers and clippers 78 are connected to the wave shaping filter or integrator 66 which is connected to the divider 63. Assuming that the divider 63 is properly chosen, the integrator 66 will supply current at a frequency of 60 cycles to the amplifiers and clippers 78. If the source 79 is normally at the same frequency then the control voltage supplied by the phase comparators 76 is of a value which is dependent upon the amount of phase difference between the two applied alternating currents. The amplifiers and clippers ensure application of current at the same amplitude from both the reference frequency and from the pulse generating means to the phase comparator.

Thus, during recording operation, the frequency supplied by the pulse generating means is recorded as a control frequency along one margin of the tape, and sub-multiples of this frequency, as for example 60 cycles per second, is applied to the phase comparator 76. A like frequency is supplied from the reference source 79. The phase difference between these two signals causes a change in the control voltage applied by the phase comparator to the reactance tube 73. This causes compensating changes in the frequency supplied to the power amplifier 71 by a variable oscillator 72. Consequently the frequency supplied to the motor 24 varies, whereby the speed of the motor varies in conjunction with the phase difference detected by the phase comparator 76. This arrangement serves to compensate for certain mechanical deficiencies of the apparatus.

For reproducing operations, the switch S1 is shifted to connect the input of the amplifier 67 to the output of the variable oscillator 81. The variable oscillator 81 includes means whereby its frequency of operation is changed in response to a controlling voltage. This, for example, may comprise a reactance tube 82 which varies the frequency of the oscillator 81 in response to a controlling voltage. The controlling voltage is applied to the reactance 82 through a low pass filter 83 which is connected to the output of the phase comparator 84. The amplifiers and clippers 86 and 87 serve to supply currents having the same amplitude to the phase comparator. The amplifiers and clippers 86 are connected to the wave shaping filter or integrator 62 which in turn receives a frequency which corresponds to that of the pulse generator. The amplifiers and clippers 87 are connected to the control track playback amplifier which receives its signal from the transducing head 19. This head serves to reproduce the control pulses which were recorded during the recording operation. The phase comparator 84 supplies an output voltage which is dependent upon the phase difference of the currents supplied by the amplifiers and clippers 86 and 87. As previously described, one of the amplifiers and clippers is connected to receive the generated pulses which have a frequency dependent upon the speed of the wheel 23 while the other is connected to receive the pulses which were recorded during the recording operation. The phase comparator gives an output voltage which depends upon the frequency difference of these pulses. Thus, during reproduction operations, the capstan motor M is under close control by virtue of the frequency supplied by the variable oscillator 81. The motor M drives the tape past the rotary head assembly at a speed which is precisely the same as the speed which occurred during the recording operations. The servo system described for controlling the motor repeats variations which occurred during recording during reproduction.

The tracking control 89 which is interposed between the amplifiers and clippers 87 and the playback amplifier 88 has a phase adjusting device. By adjusting the tracking control during operation the transducer units are brought into proper tracking relation with the recorded tracks on the magnetic tape which passes under the recording heads.

For purposes of illustration, it is assumed that the frequency spectrum desired to be recorded extends over the band 0–3 mc. It is, of course, to be understood, that this frequency band is chosen for purposes of illustration only and that by appropriately choosing the frequency of various components to be described in conjunction with the system, any frequency spectrum may be folded and interlaced in the same manner as described in conjunction with this example.

Figure 1B:
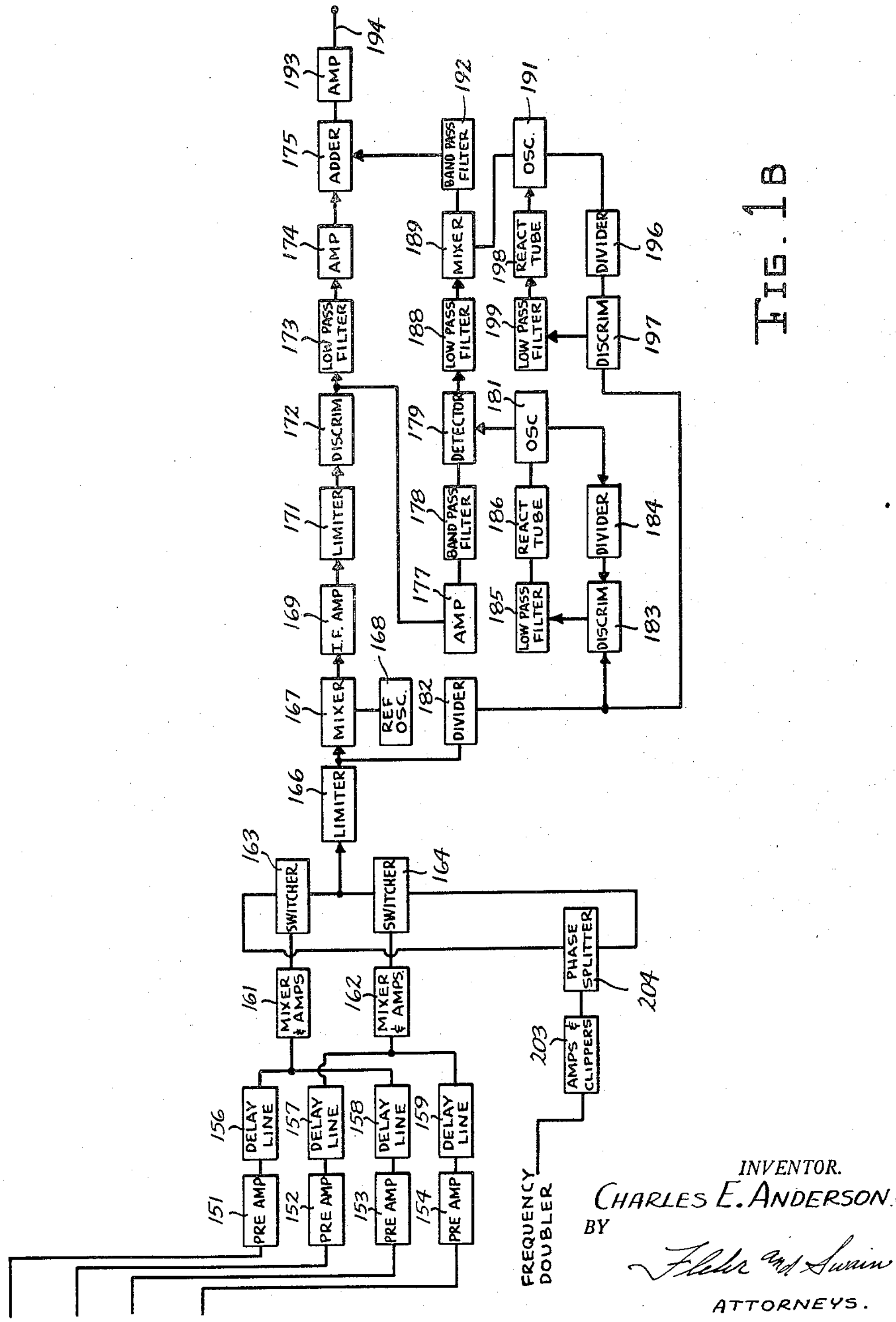

In Figure 1, the electronics connected to the units of the head assembly and used in recording are illustrated in Figure 1A, and the electronics for playback are illustrated in Figure 1B. The signal to be recorded which, for example, may be the video signal containing frequencies ranging up to 3 mc. or more, is applied to the input 101 of the system where it is split into two parts designated as 102 and 103. One part is amplified by the amplifier 104 and applied to a low pass filter 106 which removes all frequencies above a predetermined frequency, for example 2 mc. The signal is then amplified by the amplifier 107 and applied to the adder 108 which serves to combine this signal with the other signal, to be presently described.

The portion 103 is amplified by the amplifier 109 and applied to a band pass filter 111. The band pass filter serves to select a predetermined band of frequencies, for example the frequencies which lie in the band 2–3 mc. This band of frequencies is then applied to the mixer 112 where it is mixed or heterodyned with the output of a local oscillator 113. The heterodyning serves to invert and shift the frequencies from the range 2–3 mc. to the range 0–1 mc.

The output of the mixer 112 is then passed through a low pass filter 114 and sent to a suppressed carrier amplitude modulator 116. In the modulator 116 the output of the oscillator 117 is modulated in accordance with the shifted and inverted frequency to form sidebands which contain the frequency components supplied by the mixer 112. The output of the modulator is passed through a low pass filter 118 which serves to pass the lower sidebands and is then applied to the adder 108. By properly selecting the frequency of operation of the oscillators 113 and 117, the frequency will be shifted and inverted whereby the sidebands lie in the same band as the signal 102 and the energy clusters will be interlaced with its clusters whereby the composite spectrum leaving the adder will contain the original picture information or intelligence but occupy a frequency band which is substantially less than the original band. In the example chosen, the new frequency spectrum will lie within the band 0–2 mc.

The frequencies of all oscillators employed in the system are locked to a crystal controlled oscillator. Thus the crystal oscillator 121 has its output applied to a divider 122 which serves to divide the frequency. The oscillators 113 and 117 are of the type which may have their frequency controlled by a controlled voltage. For example, the oscillators may include reactance tubes which serve to control the frequency of oscillation in response to a controlling voltage. The frequency of operation of the oscillator 113 is controlled by comparing its frequency with that of the crystal controlled oscillator 121. When the frequency varies, the reactance tube 123 serves to correct the frequency. The voltage applied to the reactance tube is derived through the discriminator 124 as follows: A sample of the oscillator frequency is applied to the divider 122 and thence to the phase discriminator 124. A sample of the frequency of the oscillator 113 is applied to the divider 126 and then to the discriminator 124. The two frequencies are compared by the discriminator 124 and a voltage proportional to the difference of the two frequencies is applied to the reactance tube 123 through the low pass filter 127. The reactance tube then serves to control the frequency of oscillation of the oscillator 113.

The oscillator 117 is also of the type which may have its frequency controlled by a control voltage. The oscillator 117 may include a reactance tube 131 which serves to control its frequency of operation. The voltage applied to the reactance tube through the low pass filter is derived by comparing the divided frequency of the oscillator 117 with the divided frequency of the crystal oscillator 121. Thus, the ouput of the oscillator 117 is applied to the divider 133 which serves to appropriately reduce the frequency and apply it to the discriminator 134. The output of the divider 122 is also applied to the discriminator 134. The two frequencies are compared by the discriminator 134 and a voltage proportional to the difference in frequency is applied to the reactance tube 131 through the low pass filter 132 to control the frequency of the oscillator 117.

The new frequency spectrum is applied to the reactance tube 136. The reactance tube 136 controls the frequency of oscillation of the high frequency oscillator 137. The output of the oscillator 137 is mixed 139 with the output of a crystal controlled oscillator 138 to produce a frequency modulated carrier whose average or rest frequency is closely controlled.

The carrier frequency is drawn off before the amplifier 141 and divided by the divider 142, where it is compared with the signal from the crystal oscillator 121 which has been divided by the divider 143. The discriminator 144 serves to compare the two signals and give an output voltage which is proportional to the frequency difference of the two signals. The output of the discriminator 142 is padded or filtered through a low pass filter 146 to remove modulation effects and is then applied to the reactance tube 136 which modulates the oscillator 137. In this manner the frequency of the oscillator 137 is closely controlled and tied to the frequency of the oscillator 114.

The output of the amplifier 141 is applied to the record amplifiers 147–150 where they are applied to the previously described head assembly for recordation on the magnetic tape.

Thus it is seen that the carrier, sub-carrier and local oscillator are all referenced to the crystal controlled oscillator 121. As will be presently described in conjunction with the reproducing operation, this is important since the suppressed carrier modulation is employed from the higher frequency components. In order to reinject the sub-carrier in reproduction, it is necessary that there be some exact relationship between the main carrier frequency and the sub-carrier frequency. By referencing the sub-carriers and carrier to a common crystal controlled frequency, any changes in head speed will be compensated for automatically. If the head is faster during playback, the main carrier frequency and sub-carrier sideband frequency will be high, but the local sub-carrier oscillators will also be raised since they are locked to the carrier frequencies. Their proper ratio to the horizontal scanning frequency will therefore be preserved.

The electronics for reproduction consist of pre-amplifiers 151–154 which have their input connected to the multiple switch S2, which serves to connect the pre-amplifiers to the head through the slip rings. The outputs of the pre-amplifiers are applied to the delay lines 156–159. These delay lines have a broad band characteristic and have sufficient adjustment to compensate for variations in angularity between the heads as previously described. The outputs of the delay lines 156 and 158 are combined and applied to the mixer amplifier 161, and the outputs of the delay lines 157 and 159 are applied to the mixer amplifiers 162. The two channels represented by the mixer amplifiers 161 and 162 are applied to the switching or gating means 163 and 164. These devices are of the electronic type and are adapted to be controlled by application of the controlling voltage to either block or pass current from the outputs of the amplifiers 161 and 162. The outputs of the switching device are connected through the limiter 166 to the mixer 167. In the mixer 167 the frequencies from the limiter 166 and the reference frequency 168 are mixed to provide intermediate frequencies which are applied by the intermediate frequency amplifier 169. The output of the amplifier 169 is applied to a limiter 171 and then to the discriminator 172 for demodulation. The output of the discriminator is passed through a low pass filter 173 which has the same band pass as the filter 106 and is amplified by the amplifier 174 and applied to the adder 175. In the example chosen for purposes of illustration, the frequency applied to the adder 175 by the amplifier 174 lies in the frequency band of 0–2 mc.

The lower sideband products of the suppressed sub-carriers are removed at the detector or discriminator 172, amplified by the amplifier 177 and applied to the band pass filter 178 which serves to remove the lower sideband products of the sub-carrier. These products are then applied to the detector 179. The oscillator 181 serves to reinject the sub-carrier frequency. The frequency of the oscillator 181 is controlled by the main carrier frequency.

The frequency is controlled by dividing the main carrier frequency at the divider 182 and applying the divided frequency to the discriminator 183. A signal having a local oscillator frequency is removed from the oscillator 181 and applied to a suitable divider 184. The output of the divider 184 is also applied to the discriminator 183. The discriminator serves to derive an output voltage which is proportional to the frequency difference between the divided carrier and the divided oscillator frequencies. The output voltage is passed through a low pass filter 185 and applied to the reactance tube 186 which serves to control the frequency of operation of the oscillator 181. Thus the frequency of the local oscillator is referenced to the carrier frequency.

The demodulated signal is now inverted and shifted in frequency and combined with the low frequency components. Thus it is passed through a low pass filter 188 and applied to the mixer 189 where it is heterodyned with a local oscillator 191. The ouput of the mixer is passed through a filter 192 and applied to the adder. The combined frequencies are then amplified by the amplifier 193 and applied to the terminal equipment 194. The output signal 194 corresponds to the input signal.

The frequency of the local oscillator 191 is likewise referenced to the carrier frequency. Thus a sample of the oscillator frequency is divided by the divider 196 and applied to the discriminator 197. The divided carrier is also applied to the discriminator 197. The output voltage of the discriminator which is proportional to the frequency difference is applied to the reactance tube 198 through the low pass filter 199. The reactance tube 198 serves to control the frequency of oscillation of the local oscillator 191.

Thus it is seen that in reproduction the various oscillators are all referenced to the carrier. As previously described, this serves to reduce any effects which may result from changes in head speed.

Control pulses are applied to the switching devices 163 and 164 from the pulse generator. The output of the cathode follower, Figure 1A, is applied to the integrator or wave shaping filter 62 and to the frequency doubler 202. The output of the frequency doubler is applied to the amplifiers and clippers 203, which connect with the phase splitter 204. Thus, timed voltages of opposite polarity are obtained from the phase splitter for application to the switches 163 and 164, whereby these switches alternately pass the output from the mixers and amplifiers 161 and 162 during successive intervals.

Over-all operation of the system shown in Figure 1 is as follows: Assuming by way of example that the speed of movement of each transducer unit on the rotary head assembly is in the order of 1700 inches per second relative to the tape, it is satisfactory for recording television signals to employ a carrier having a center frequency of 4.016 mc. A frequency of 5 mc. is near the upper frequency limit which can be effectively recorded by conventional magnetic tape and transducing units of the magnetic type, although we have demonstrated the feasibility of recording and reproducing frequencies as high as 6 mc. The frequencies far above 4–4.5 mc. have a fall-off in effective recording. However, the fall-off is gradual and is not such an abrupt cut-off as may cause undesirable effects. Consequently in the present system we employ residual sideband F.-M. recording because the sideband components substantially above 4 mc. are not effectively recorded or reproduced.

Apparatus was constructed as shown in Figure 1 in which the low pass filter 106 had a pass band of from 0–2.0 mc. The frequency of the oscillator 113 was 3.012 mc. and this frequency was controlled as previously described by the crystal controlled oscillator 121. The band pass filter 111 served to pass the higher frequency components lying between 2–3 mc. The oscillator 117 had a frequency of oscillation of 2.008 mc. and was controlled by the crystal controlled oscillator 121. The combined signals were applied to the reactance tube where they served to control the oscillator 137 which operated at 49.016 mc. The crystal controlled oscillator 121 operated at a frequency of 45 mc. Thus the output frequency of the mixer 139 had a center frequency of 4.016 mc.

In reproduction, the low pass filter 173 had a pass band of 0–2 mc. The band pass filter 178 had a band pass of 1–2 mc. The band pass filter 192 had a pass band of 2–3 mc. The local oscillator 181 had a frequency of 2.008 mc. and the local oscillator 191 had a frequency of 3.012 mc.

It will be evident to those familiar with television systems that the input video signal may be obtained at the camera chain or may be obtained from a standard television receiver. Similarly, the reproduced video output can be used to produce a video image with an ordinary television receiver. With the present system, the synchronizing pulses can be recorded together with the video frequencies for proper control of the television receiver. The reproduced signal may also be applied to a transmitter for transmission.

It is further to be understood that although the equipment has been described in detail in conjunction with recording and reproducing of video signals having a frequency spectrum which lies in the frequency band 0–3 mc., it is adaptable to recording of frequencies which extend over a considerably greater band and for recording frequencies which are derived from other terminal equipment.

Figure 5:
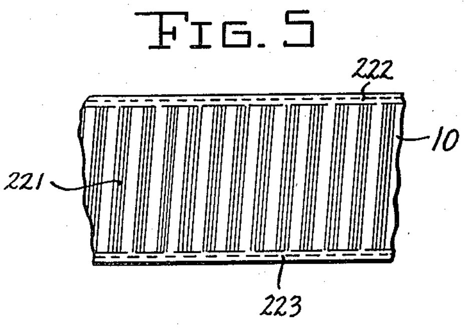
Figure 5 is a plan view illustrating record track on the magnetic tape.

Figure 5 illustrates a portion of magnetic tape 10 with records upon the same. The area 221 (exaggerated as to spacing) represents the rectilinear track areas which are swept by the magnetic head units. These areas are slightly spaced apart in the direction of the length of the tape and are disposed at an angle slightly less than 90° with respect to the length thereof. By way of example, where the magnetic tape is two inches in width, each record area may have a width measured lengthwise of the tape of 10 mils. Dotted lines 222 and 223 represent the demarcation between tracks which carry picture intelligence and the marginal edge portions over which the erase heads 18 and 20 are operated. The head 18 is shown operating immediately in advance of the head 19 during recording. On the other margin of the tape, the head 20 can function as an erase head in advance of the head 21. Head 21 can be used for recording the sound signals. Shortly before a transducer unit reaches the line 223, the succeeding head reaches the line 222. Switching operations occur shortly before the transducer units reach the line 223. In Figure 5 it is assumed that the lower marginal head is being used for recording of audio frequencies and the upper margin for the recording of control frequencies. In both instances, the erase operations performed by the heads 18 and 20 eliminate most, but not all, of the track portions carrying duplicate picture information. The signal recorded by the rectilinear transverse tracks is a frequency modulated carrier whose frequency components correspond to the combined signal applied to the reactance tube 136. This signal is a composite signal having frequency components which correspond to the combined signal.

For recording operations the switches S1 and S2 are positioned as illustrated in solid lines. The rotary head employed is started in operation by energizing the motor 24 and the tape is driven by starting the motor M. The speed of operation of both of these motors is closely controlled in a manner presently described. The video output is applied to the input amplifiers, for example amplifiers 104 and 109. These signals are operated upon as previously described and then applied to separate record amplifiers 147–150 which energize separate transducer units of the rotary head assembly. The result is that as each head unit sweeps across the tape it records the frequency modulated carrier in a manner previously described. After recording operations the motors are deenergized and the tape is wound back upon the supply reel 12 for a playback operation. The tape may now be applied to another machine with the same electronics as shown in Figure 1B but having a rotary head which may not be precisely the same as the rotary head used in recording equipment due to slight inaccuracy in manufacturing, or possibly due to wear during usage.

The capstan motor of the reproducing apparatus is started in operation and by virtue of the manner in which the motors are controlled, the transducer units are caused to accurately track upon the recorded areas. In addition, the speed of movement of the transducer unit with respect to its track is controlled in precisely the same manner as in recording, the currents introduced in the units of the separate heads being applied to the preamplifiers 151–154 and thence to the delay lines 156–159, and then to the mixer amplifiers 161 and 162. The output of the mixer amplifiers are ultimately passed by the switching devices 163 and 164 and combined for application to the limiter 166. A portion of the carrier is sampled and applied to the local oscillator frequency control system. The signal is demodulated and applied to a low pass filter to extract the lower frequency components. The signal is also applied to a single sideband detector and then to a heterodyne or mixing system to invert and shift the frequency so that the higher components are reproduced. The two signals are applied to an adder which serves to combine the signals and apply the same to terminal equipment.

Figure 6:
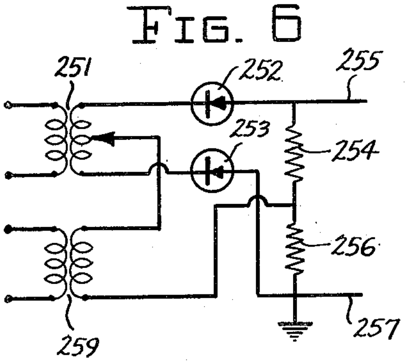
Figure 6 is a circuit diagram of a suitable phase comparator for use in the speed control system.

Various types of phase comparators can be used in connection with the motor control system shown in Figure 1. In Figure 6, we have shown a suitable phase comparator utilizing two diodes. Thus the transformer 251 has its secondary terminals connected to the cathodes of the diodes 252 and 253. The diodes have their anodes connected across load resistors 254 and 256 which in turn connect with the grounded conductor 257 and to the output conductor 258. A second transformer 259 has one terminal of its secondary connected to a center tap on a secondary of the transformer 251. The other secondary terminal of the transformer 259 connects to the common junction of the resistors 254 and 256.

Operation of the phase comparator is as follows: A frequency is applied to the primary of the transformer 259 from one of the amplifiers and clippers. Another signal is applied to the transformer 251. The voltage developed across the secondary of the transformer 251 either adds to or subtracts from the secondary voltage of the transformer 259, depending upon the instantaneous polarity relationship of the two signals. The average current of each of the diodes 252 and 253 depends upon the length of time during each cycle that their applied voltages are in additive or subtractive polarity. This in turn depends upon the phase angle between the two applied waves. When the phase angle is 90° or 270°, the average currents of the diodes are equal, and equal voltages of opposite polarity are developed across the load resistors 254 and 256. Hence the net voltage between the conductors 258 and ground is zero. If the phase angle departs from 90° or 270°, the average diode current will become unbalanced, and the net output voltage between the conductor and ground will no longer be zero. Therefore, the output voltage polarity will depend upon whether the phase angle is leading or lagging the 90° or 270° relation, and the magnitude will be proportional to the amount of lead or lag. Assuming that both applied frequencies have substantially the same wave form, a linear relation between the output voltage and phase angle is obtained over a range of 90°. Since the current flow through the diodes is in the form of pulses, it is desirable to provide a low pass filter in the phase comparator output so that only the direct current voltage proportional to the average current is applied to the associated reactance tube.

Figure 7:
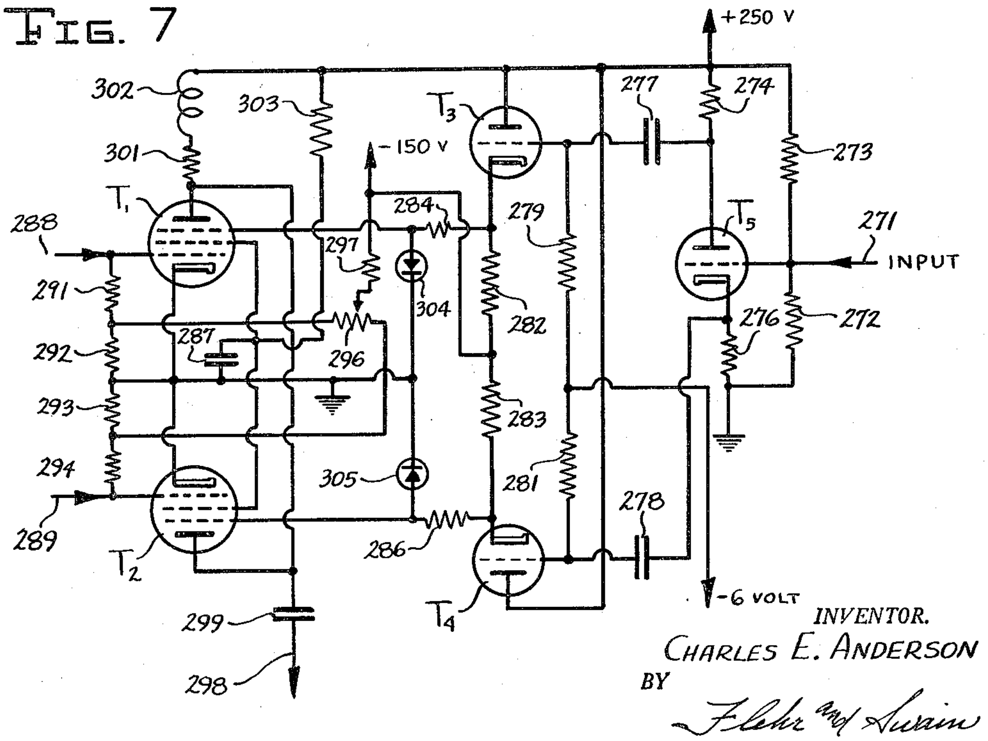
Figure 7 is a circuit diagram illustrating a suitable switching circuit.

Figure 7 illustrates a suitable circuit for the switchers 163 and 164, and also for the phase splitter 204. Cathode followers are incorporated in this circuit for coupling between the phase splitter and the switching tubes. In this instance, tubes T1 and T2 function as switching tubes, tubes T3 and T4 function as cathode followers, and the tube T5 serves as a phase splitter. The input lead 271 is applied to the control grid of tube T5, and this grid also connects to ground through the resistor 272, and to a source of biasing voltage, such as indicated at +250 volts through the resistor 273. The plate of this tube connects to the indicated +250 volts through the resistor 274 and the cathode connects to ground through the cathode resistor 276. The plate of the tube T5 is coupled by condenser 277 with the control grid of the cathode follower tube T3. The control grid of the tube T4 is similarly coupled to the cathode of the tube T5, through condenser 278. The indicated −6 volts bias supply is connected to the control grids of tubes T3 and T4 through the resistors 279, 281. The indicated −150 volt supply connects with the cathodes of the tubes T3, T4 through the cathode resistors 282 and 283.

The plates of both of these tubes connect to the indicated +250 volt supply. The suppressor grids of the tubes T1, T2 are connected to the cathodes of the tubes T3, T4 through the resistors 284 and 286. The screen grid of these tubes T1, T2 are connected together and to ground through the condenser 287. The input leads 288 and 289 (from the mixers and amplifiers 161 and 162) directly connect with the control grids of the tubes T1, T2. These leads also are connected to ground through the series connected resistors 291, 292, 293 and 294. A potentiometer 296 has its one terminal connected to the points 291 and 292 and its other terminal to the point of connection between the resistors 291 and 294. The movable contact of this potentiometer is connected by the resistor 297 to the indicated −150 volt supply. By adjusting the potentiometer 296 the bias upon the control of the tubes T1, T2 can adjust for a proper balance of operation. The output lead 298 is coupled to the plates of the tubes T1, T2 through the condenser 299. The plates are directly connected together and also they connect through the resistor 301 and inductance coil 302 to the indicated +250 volt supply. The screen grid of the tubes T1, T2 also connects to the +250 volt supply through the resistor 303.

Clamping means of the diode type are also provided in this circuit for preventing the suppressor grids T1, T2 from going too positive. Thus, diodes 304 and 305 connect between the suppressor grid and ground for the tubes T1, T2, respectively.

The circuit illustrated in Figure 7 functions as follows: Assuming that a substantial square wave is applied to the input lead 271, the phase splitter formed by the tube T5 and its associated circuit components provides split phase voltages on the grids of the cathode follower tubes T3, T4 which in turn are coupled to the suppressor grids of the tubes T1, T2. Thus, these tubes are alternately driven between voltage values to provide alternate conducting and non-conducting states for the tubes T1, T2. During the period that one of the tubes T1 or T2 is conducting, signals applied to one or the other of the corresponding input leads 288 and 289 are transmitted to the output lead 298.

It is desirable to employ the rotary transducer type of apparatus described for recording and/or reproducing signals which have relatively high frequency components. In some instances it may be practical to employ magnetic tape apparatus of the type in which the magnetic medium is moved past a stationary head. For relatively high frequencies, such apparatus is not considered satisfactory because of the relatively high tape speed required. However, at the lower frequencies where the useable tape speed is reasonable, the modulated carrier may be effectively recorded and/or reproduced by such equipment. Also for a lower frequency spectrum I may record the composite spectrum directly without modulating a carrier.

It will be evident that my method and system can be used when it is desired to record a frequency which covers a wide frequency band, and in which the frequencies encountered are substantially higher than those that can be recorded by use of conventional magnetic equipment. The system serves to shift and invert the upper frequencies and to interlace the same with the lower frequency components. Upon reproduction, the modulation components are extracted and then operated upon to produce the original wide band frequency spectrum. Particularly the invention disclosed is suitable for recordation and reproduction of television or like signals.

Reference is also made to copending application Serial No. 552,868, filed December 13, 1955, in the names of Charles P. Ginsburg, Shelby F. Henderson, Jr., Ray M. Dolby and Charles E. Anderson, entitled "Magnetic Tape System and Method."

I claim:

1. In apparatus for recording a broad band frequency spectrum, means for splitting said broad band frequency spectrum into two frequency bands, one of said bands comprising the higher frequency components and the other the lower frequency components, means for heterodyning the upper frequency components to thereby shift and invert their frequency, means for forming an amplitude modulated subcarrier, the modulation being in accordance with said shifted and inverted frequencies, means for adding said lower frequency components to the said amplitude modulated subcarrier to form a composite signal, means for forming a frequency modulated carrier, the modulation of said carrier being in accordance with the composite signal, transducing means adapted to be energized by said frequency modulated carrier, and means for transporting a magnetic tape in operative relationship with the transducing means whereby the frequency modulated carrier is recorded thereon.

2. In apparatus for recording a broad frequency spectrum, means for splitting said broad frequency spectrum into two frequency bands, one of said bands comprising the higher frequency components and the other the lower frequency components, means for heterodyning the upper frequency components with a local frequency to therefore shift and invert their frequency, means for forming an amplitude modulated carrier, the modulation being in accordance with said shifted and inverted frequencies, means for adding said lower frequency components to the amplitude modulated subcarrier to form a composite signal, means for forming a frequency modulated carrier, the modulation of said carrier being in accordance with the composite signal, means serving to reference said local and subcarrier frequencies to the carrier frequency, transducing means, and means for transporting a magnetic tape in operative relationship with the transducing means whereby the frequency modulated carrier is recorded thereon.

3. In apparatus for reproducing a magnetic tape record of a broad frequency spectrum of the character described, transducing means serving to reproduce the frequency modulated carrier, means for transporting the tape in operative relationship with said transducing means, means for demodulating said frequency modulated carrier to form a composite signal, means for extracting the lower frequency components from said composite signal, means for injecting a subcarrier and demodulating said upper frequency components, means for heterodyning said upper frequency components with a local frequency to invert and shift their frequency, means for referencing said subcarrier and local frequencies to the carrier frequency, and means for combining said lower frequency components with the upper frequency components to form the broad band frequency spectrum.

References Cited in the file of this patent

UNITED STATES PATENTS

| | | |
|---|---|---|
| 2,245,286 | Marzocchi | June 10, 1941 |
| 2,583,983 | Arndt et al. | Jan. 29, 1952 |
| 2,635,140 | Dome | Apr. 14, 1953 |
| 2,668,283 | Mullin | Feb. 2, 1954 |
| 2,685,079 | Hoeppner | July 27, 1954 |
| 2,686,831 | Dome | Aug. 17, 1954 |
| 2,697,755 | Friend | Dec. 21, 1954 |
| 2,764,463 | Lubkin | Sept. 25, 1956 |